United States Patent [19]

Tan

[11] Patent Number: 4,535,450
[45] Date of Patent: Aug. 13, 1985

[54] DIGITAL SIGNAL REPEATING SYSTEM

[75] Inventor: Yoichi Tan, Kanagawa, Japan

[73] Assignee: Fuji Xerox Co., Ltd., Tokyo, Japan

[21] Appl. No.: 437,595

[22] Filed: Oct. 29, 1982

[30] Foreign Application Priority Data

Oct. 30, 1981 [JP] Japan ................................ 56-172899

[51] Int. Cl.³ ............................ H04J 3/00; H04J 6/00; H04J 3/02
[52] U.S. Cl. ...................................... 370/94; 370/88; 370/86; 370/85
[58] Field of Search ...................... 370/94, 86, 88, 97, 370/60, 85

[56] References Cited

U.S. PATENT DOCUMENTS 3,890,471 6/1975 Hachenburg ........................ 370/88
4,287,592 9/1981 Paulish et al. ...................... 370/94
4,370,744 1/1983 Hirano et al. ....................... 370/88

OTHER PUBLICATIONS

E. Faldella, "A Microprocessor-Controlled Packet Transmission System", EUROMICRO Jnrl., Nov. 1980, No. 6, pp. 417–427.

Primary Examiner—Douglas W. Olms
Assistant Examiner—Wellington Chin
Attorney, Agent, or Firm—Sughrue, Mion, Zinn, Macpeak & Seas

[57] ABSTRACT

A communication system includes a plurality of digital signal transmission systems each connected to the next by a repeater installation. Signal packets travelling from a station in one system to a station in another adjacent system are picked out by a repeater station and stored in a buffer memory. The contents of the memory are compiled into a packet for transmission to the other system, with an address designating the station of the other system, and are inserted into an empty block or blocks of a periodically repeated frame of the other system with a waiting time of less than one complete frame.

10 Claims, 9 Drawing Figures

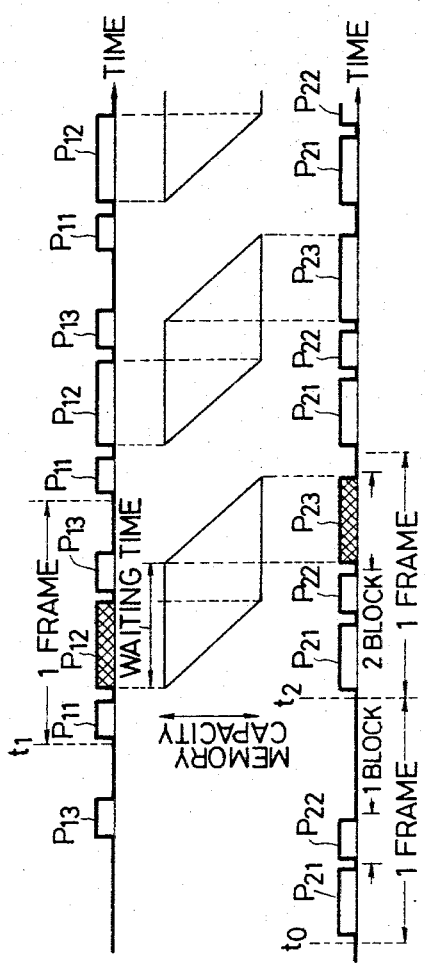
FIG. 4(a)
FIG. 4(b)
FIG. 4(c)
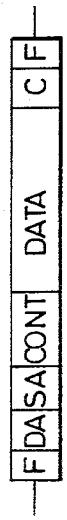
FIG. 5
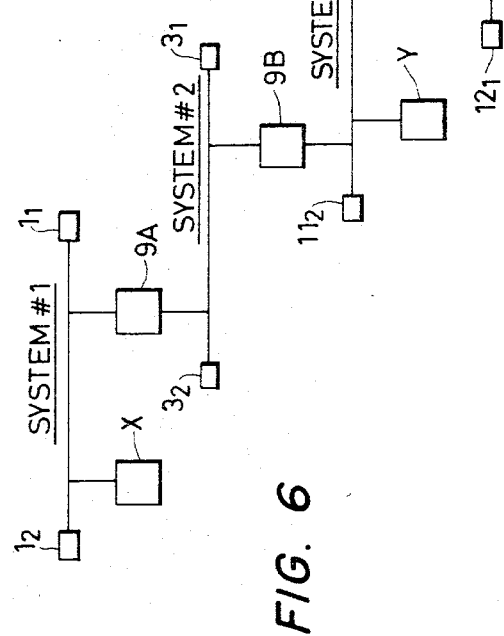
FIG. 6

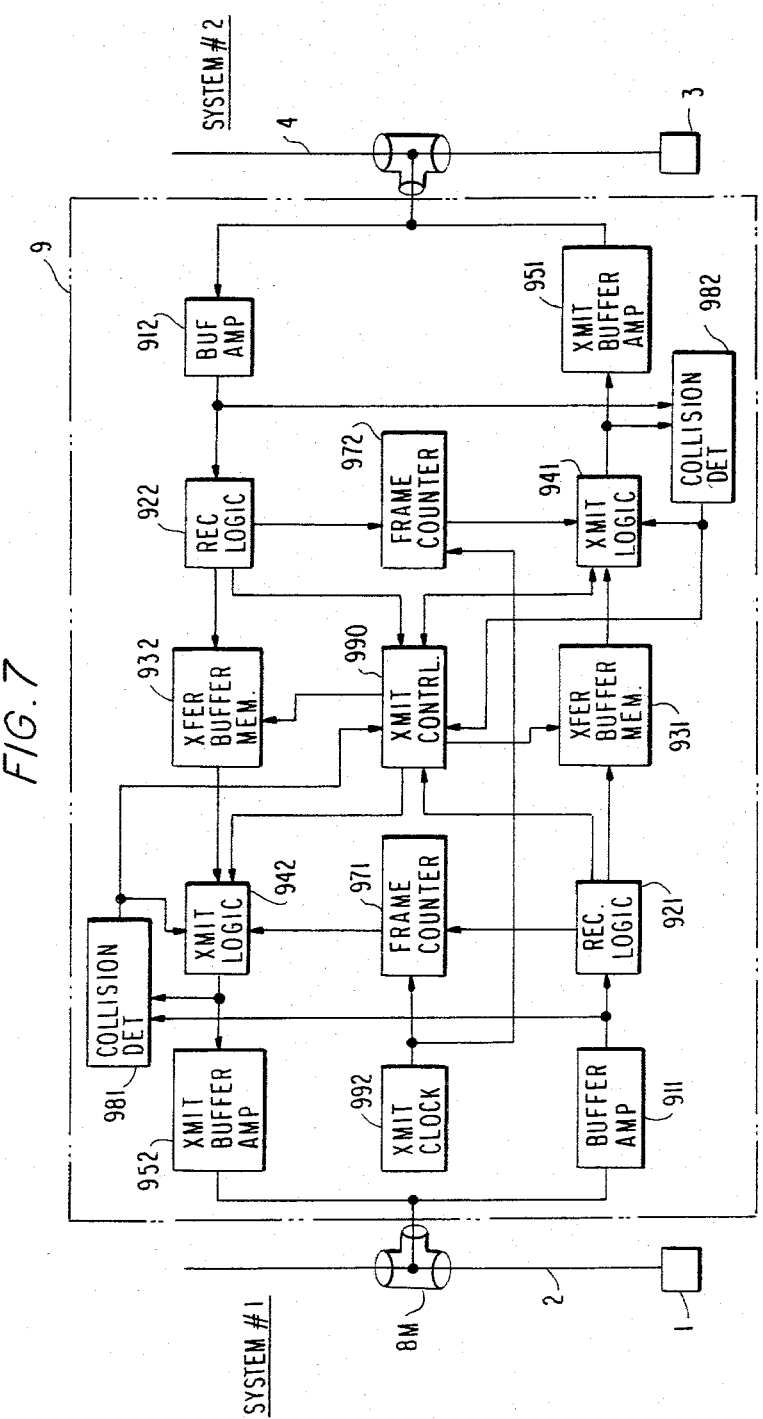

DIGITAL SIGNAL REPEATING SYSTEM

BACKGROUND OF THE INVENTION

The present invention relates to a digital signal repeating system as between communication cables in a communication system in which data transmission is effected in a time division multiplex mode using the communication cables.

As computers have proliferated and as digital signal processing techniques have progressed, data communication techniques have moved into the limelight, by which techniques a communication system and a data processing system are combined so as to enable information to be processed on-line. A small-scale communication system, such as a private communication system installed on the precincts of government and public agencies, companies, or the like, and especially such as a communication system operating in packet form using a communication cable, such as a coaxial cable, has attracted public attention in view of its inexpensiveness, high reliability and high transmission efficiency.

In such a packet form communication system, a communication cable for effecting bidirectional transmission is disposed in a laboratory, office or the like. A number of personal stations are connected so that messages, each divided into data blocks of 1,000 to 2,000 bits, may be transmitted from each station. Each message is additionally provided with a header such as its destination, running number, or the like. In this communication system, control functions are completely distributed to the respective stations and therefore the network per se is a mere passive transmitting medium having no control functions. Accordingly, each station begins to transmit a message after it has confirmed emptiness of the tranmission line. When a collision between one station's packet signal and another packet signal from another station occurs during the transmitting operation, both concerned stations stop their transmitting operations. Each of the stations which has stopped its transmitting operation will then try to transmit the message again after the lapse of a random queuing time.

In such a communication system, any user at any station not only can access one and the same computer but also can utilize any hardware such as a memory means or any software such as programs, numbers of hardware units and softwares distributed to plural stations. That is, in this communication system, devices such as high speed or high precision printers, large scale files, or the like, which have been concentrated at the location of a large-sized central computer in a time sharing system, may be utilized under the condition that they are distributed to the respective stations. Thus, it becomes possible not only to economize resources and to improve practical efficiencies but also to develop a large-scale software system due to the accommodation of programs and data. Further, there is no priority in using the transmission line among the users or personal stations in such a communication system. Accordingly, there is no master/slave order or the like which is often provided in other systems, so that communication is allowed with equality between any of the stations connected to the transmission line. Further, since the transmission line, such as a coaxial cable, is constituted by a completely passive circuit, a highly reliable system may easily be provided.

Thus, this communication system has various advantages, but there is a possibility in this system that packet signals will collide with each other on the same transmission line since each station can begin transmitting data at any desired time. Such collisions between packet signals will be largely increased as the operation efficiency of the transmission line becomes higher.

To solve this problem, there have been proposed signal transmission systems such as the so-called "Priority Ethernet" and the so-called "Reservation Ethernet." In the former system, the priority of signal transmissions of each station is described in the preamble portion of a packet signal so that if a collision occurs between packet signals from different stations, that one of the packet signals having the higher priority is allowed to be transmitted preferentially. In the latter system, however, a master station which indicates an operational mode is always set so as to confirm whether each of the personal stations has a signal to be transmitted in the reserved mode, and the amount of information to be transmitted. According to the result of this confirmation, the master station determines, in every frame, the order of packets to be transmitted from the respective stations so as to allow signals to be transmitted in time division multiplex fashion in the transmission operation mode.

In the former proposed signal transmission system, however, there is still the problem of variations in signal transmission delay time due to a collision between packets having the same priority. Accordingly, this system is not suitable for real time transmission, such as conventional sound (e.g. telephone) communication, in which importance is attached to the real time correspondency between transmitting and receiving operations. In the latter signal transmission system, moreover, the above-mentioned inter-station equality is lost because of the existence of the master station.

That is, if any failure occurs in the master station of this system, data communication is stopped, resulting in lowered reliability of the overall system.

In order to solve this problem, there has been proposed a digital signal transmission system in which real time transmission can be effected without losing the equality among personal stations. In this system, a frame which is cyclically repeated on the time axis is subdivided on the same time axis into a plurality of blocks so that each personal station may be given an opportunity of packet communication in one or more blocks. Thus, each station not only may have equality in using an empty block or blocks but also effect real time transmission, because an opportunity for signal transmission is periodically provided in every frame when the station occupies a certain block or blocks for a necessary period of time for signal transmission.

In a signal transmission system in which the above communication system is employed, there have been caused the following problems when a long communication cable is used:

(1) Distortion in the signal waveforms transmitted on the communication cable; and (2) An increase in signal propagation delay time between stations.

Problem (1) is caused by the deterioration in the frequency characteristic of the communication cable in the high frequency band. If a high speed packet signal is transmitted through such a communication cable, the transmission waveform is distorted, causing a code error in the receiving station. There has been proposed, however, an effective solution to this problem.

FIG. 1 illustrates this solution. A plurality of stations are connected to a coaxial cable 2 which is in turn connected at its end to a terminator 1. The signal transmission system associated with the cable 2 is referred to as system #1. To expand the system, assume that another cable 4 is set up which is connected at its end to another terminator 3 and to which a plurality of stations $6_1, \ldots$ are connected respectively correspondingly through a plurality of taps $5_1, \ldots$. The latter system is referred to as system #2. A repeating installation 7 is set up so as to interconnect the systems #1 and #2 to enable the two coaxial cables 2 and 4 to be equivalently regarded as a single coaxial cable, and a system #1 tap $8_M$ and a system #2 tap $5_M$ are connected through the repeating installation 7. In the repeating installation 7, there are provided transceivers 71, 72 and a repeater 73 for repeating signals transmitted through systems #1 and #2. The repeater 73 serves not only to cause signals transmitted on the coaxial cables 2 and 4 to match and to transfer a packet signal collision status, when it occurs, to the respective stations, but also to amplify the packet signal to correct the waveform distortion or shape the waveform. Thus, even if the coaxial cable is substantially long and a packet signal is transmitted along a long path, it is possible to prevent code errors from occuring.

With respect to the increase of the inter-station signal propagation delay time (problem (2) above), in the proposed communication system, as described above, a frame is subdivided into a plurality of blocks so that an opportunity of packet communication by blocks is given to each station. In this case, however, the timing of the initiation of packet signal transmission becomes a problem. For example, as shown in FIG. 2, assume that a station C is located at a longitudinally central position of a first system's coaxial cable 2, which is connected at its opposite ends to impedance matching terminators $1_1$ and $1_2$. Another station S is located between the station C and the terminator $1_1$ and is now effecting a signal transmitting operation. In this case, the packet signal sent out from the station S may be received by the station C and further stations $R_1$ to $R_4$ on the coaxial cable 2 at different points of time depending on the signal propagation delay time on the cable. Accordingly, if each station sends out its own signal without considering this delay time, there will be a possibility of the occurrence of a condition such that adjacent packets on the coaxial cable may overlap with each other.

To prevent such a serious condition from occurring, the concept of a guard time $\tau g$ is used in this system. That is, an empty bit string, which is called the guard time $\tau g$, is positioned between the respective packets to thereby prevent a collision between the packets. To this end, signal transmission from each station is controlled such that the packet signals transmitted from the respective stations may be equidistantly spaced in a row at the receiving position of the station C, and the guard time $\tau g$ is set so as to be equal to or more than two times the signal propagation delay time between the station C and the furthermost station.

That is, it is necessary to set the length of the guard time $\tau g$ proportionately to the length of the communication cable. Therefore, if the cable is long, the transmission efficiency will be lowered. Further, it is necessary to change the guard time $\tau g$ in all of the previously set up stations when the system is expanded or when a plurality of systems are interconnected, as for example shown in FIG. 1.

In sum, when it is intended to effect system expansion or interconnection among a plurality of systems in a communication system using the above proposed digital signal transmission system, there have been limitations to the extent and scale thereof.

SUMMARY OF THE INVENTION

The present invention is intended to eliminate the disadvantages mentioned above and to provide a digital signal repeating system in which the proposed digital signal transmission system is employed and wherein system expansion and interconnection among systems can easily be made.

According to the present invention, communication cables are interconnected by repeater stations. Each repeater station causes only a packet signal which is to be sent from one system to another system through the repeater station to be sent out from the first-mentioned system in synchronism with the signal transmission timing on the other system, and causes a signal which is both transmitted/received in one system to be separately processed in the one system. Thus, overlapping between packets is prevented between cables, while limiting the length of each communication cable in the system, thereby attaining the above-mentioned object of the present invention.

BRIEF DESCRIPTION OF THE DRAWINGS

FIGS. 4(a)-(c) are time charts illustrating the status of digital signal transfer between systems;

FIG. 5 shows the configuration of a packet sent from each station; and

FIG. 6 shows the system configuration of a second embodiment of the present invention.

FIG. 7 is identical to FIG. 3 except it shows a single shared transmission clock 992.

DETAILED DESCRIPTION OF THE PREFERRED EMBODIMENTS

Figure 1:
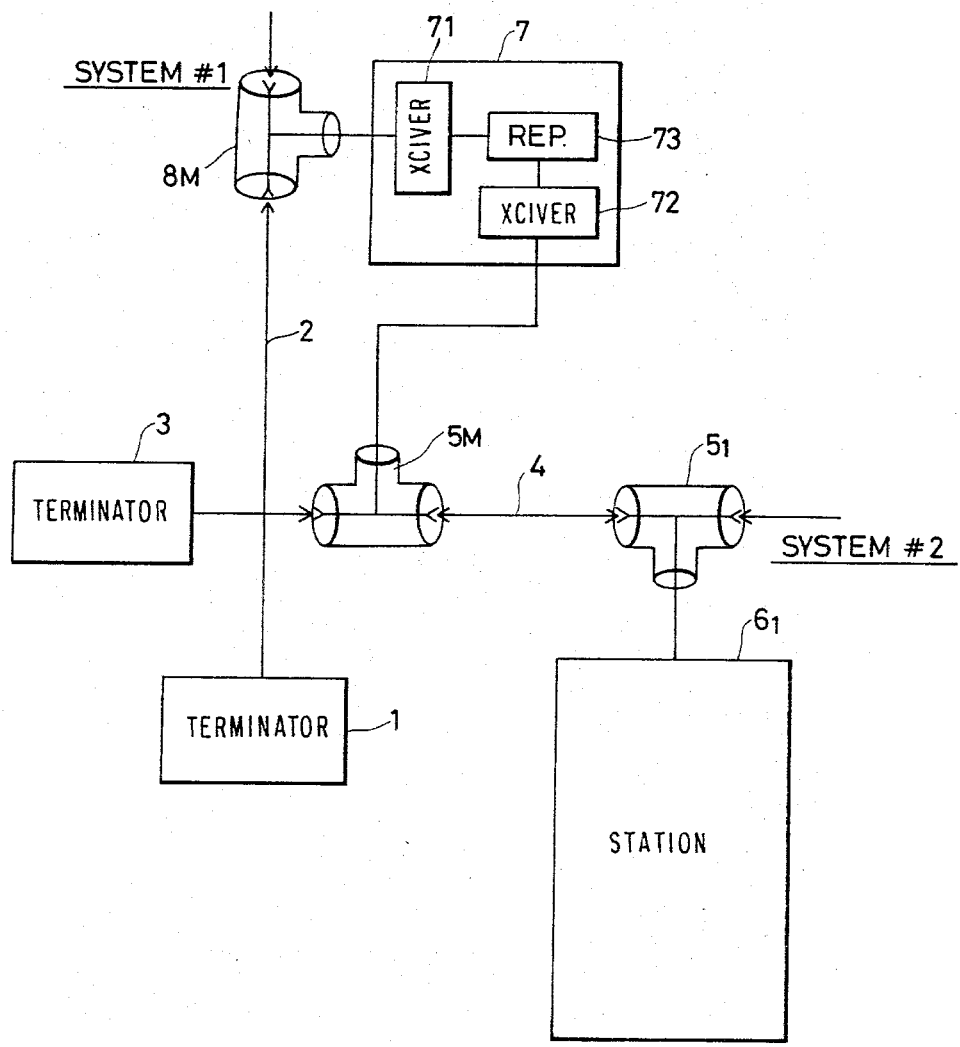
FIG. 1 is a diagram explaining a previously proposed digital signal transmission system upon which the present invention is an improvement.
Figure 2:
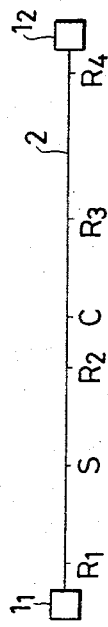
FIG. 2 is a circuit diagram showing the arrangement of stations in a communication system, for explaining the concept of guard time.
Figure 3:
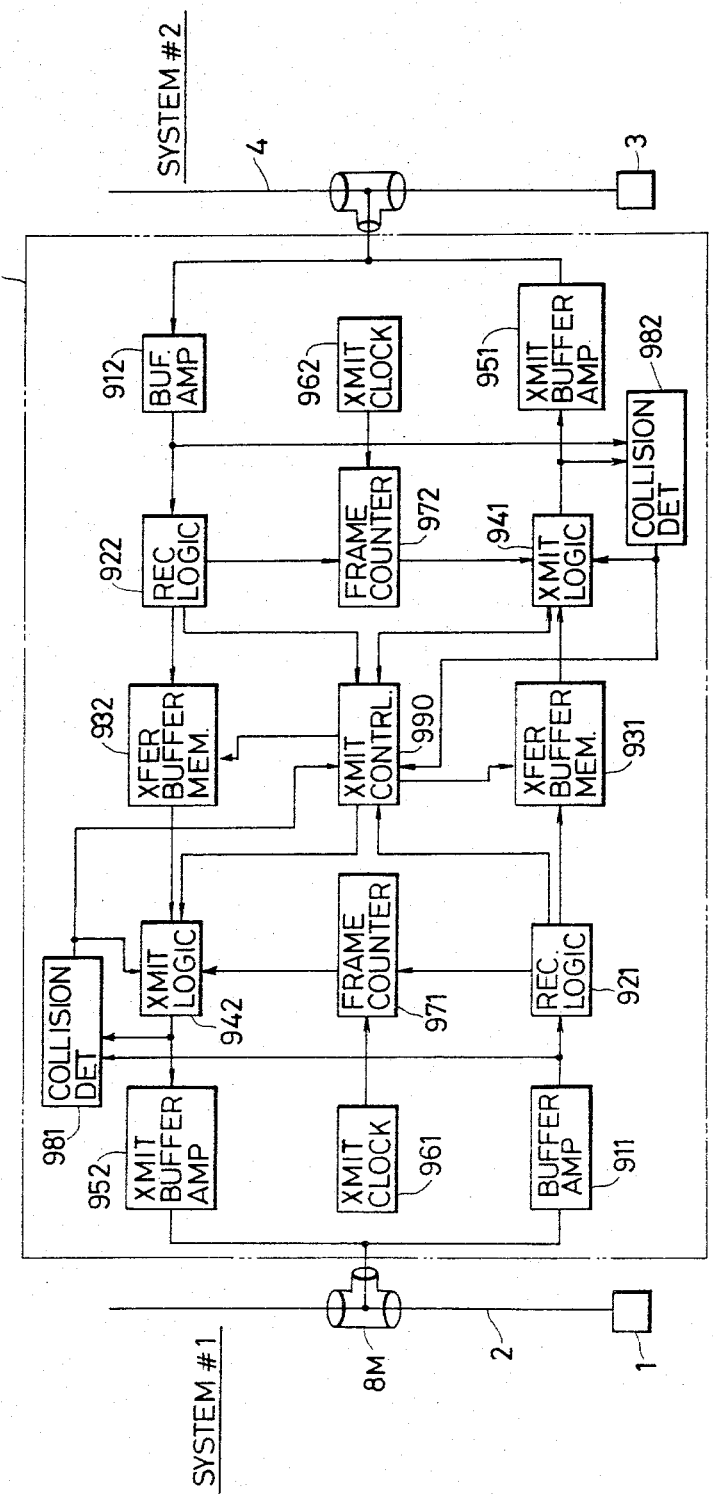
FIG. 3 is a block diagram illustrating the main portion of a repeating installation according to the invention.

FIG. 3 shows the main part of a repeating installation 9 which interconnects two systems #1 and #2. The repeating installation 9 is provided with a pair of receiving buffer amplifiers, one being a receiving buffer amplifier 911 which receives all the signals transmitted on a coaxial cable 2 of system #1, and the other being another receiving buffer amplifier 912 which receives all signals transmitted on another coaxial cable 4 of system #2. A packet signal produced from the receiving buffer amplifier 911 is decoded in a receiving logic circuit 921 to judge whether or not it is a signal to be transferred to another cable. If the signal is not to be transferred to another cable, it is discarded here. If the signal is to be transferred, it is stored in a transferring buffer memory 931. The signal read out of the transferring buffer memory 931 is configured in a transmitting logic circuit 941 into a packet signal to be sent out to system #2. The packet signal is then sent out to the coaxial cable 4 of the system #2. Similarly, a packet signal produced from the receiving buffer amplifier 912 is converted into a different form of packet signal through a receiving logic circuit 912, a transferring buffer memory 932, a transmitting logic circuit 942 and a transmitting buffer amplifier 952 and sent out to the coaxial cable 2 of system #1.

In the repeating installation 9, there are provided two transmission clock generators 961 and 962 for controlling the two groups of circuits arranged symmetrically as described above. A transmission clock pulse produced from the transmission clock generator 961 is applied to a frame counter 971 together with a reset signal for frame synchronization produced by the receiving logic circuit 921 so as to establish system timing such as frame synchronization. A timing signal produced from the frame counter 971 is applied to the transmitting logic circuit 942 and used to form a packet signal. A transmission clock signal produced by the transmission clock generator 962 is applied to the frame counter 972 to effect similar control.

The repeating installation 9 is further provided with first and second collision detecting circuits 981 and 982 and a transmission controlling circuit 990. The first collision detecting circuit 981 detects a collision occurring between the signals on the coaxial line 2 received by the receiving buffer amplifier 911 and a signal sent out from the transmitting logic circuit 942, and upon the detection of collision controls the transmitting logic circuit to effect appropriate handling such as stoppage of signal transmission. The second collision detecting circuit 982 operates similarly to the first one. The transmission controlling circuit 990 is connected to a termination controller (not shown) and controls transmitting logic circuits 941 and 942 in accordance with the signals produced by the receiving logic circuits 921 and 922.

Packet signals are transmitted onto the respective coaxial cables 2 and 4 of the systems #1 and #2, with the same frame synchronization but quite independently of one another. FIG. 4(a) shows, by way of example, signal envelope waveforms transmitted on the coaxial cable 2. In this example, three packet signals $P_{11}$, $P_{12}$ and $P_{13}$ are incorporated in one frame and are being transmitted. In a particular frame which begins from time $t_1$, assume that the first packet signal $P_{11}$ is supplied to the receiving buffer amplifier 911 through the tap $8_M$. Further assume now that the first packet signal $P_{11}$ is a signal to be transmitted/received merely within system #1. The output signal of the receiving buffer amplifier 911 is coded by the receiving logic circuit 921 to be a predetermined non-return-to-zero (NRZ) signal. Each packet is constituted by respective bit strings of (1) a flag F, (2) a destination address DA, (3) a sender address SA, (4) control information CONT, (5) transfer data DATA, and (6) error checking code C. Basically, this configuration is similar to the frame configuration in the high-level data link control process (HDLC).

The receiving logic circuit 921 judges whether the destination address DA of the NRZ signal obtained by coding coincides with that of the repeating installation 9 per se. The destination address DA of the first packet signal $P_{11}$ in this case represents the destination address of another station in system #1 and therefore this packet is discarded at this step.

Assume next that a second packet signal $P_{12}$, as shown in hatching in FIG. 4(a), has been fed to the receiving buffer amplifier 911 through the tap $8_M$. Further assume that the second packet signal $P_{12}$ is a two-block signal sent from a station in system #1 to a station in system #2 in order to establish a communication path. In this case, the destination code of the repeating installationn 9 is described in the destination address DA of the packet signal sent from the calling station and the destination code of the called station connected to the coaxial cable 4 is described in the transfer data DATA of the signal as a part thereof. The receiving logic circuit 921 detects coincidence between the destination code of the second packet signal $p_{12}$ destination address DA and that of the repeating installation. In this case, the receiving logic circuit 921 causes the transferring buffer memory 931 to write therein the contents of the second packet signal $p_{12}$ and produces a transfer request to cause the transmission controlling circuit 990 to transfer the written contents.

The transmission controlling circuit 990 is responsive to the signal supplied from the receiving logic circuit 922 to continuously watch the status of the packet signals transmitted on the coaxial cable so as to detect which block or blocks are empty in a given frame, thereby registering the newest results.

FIG. 4(c) shows signal envelope waveforms transmitted on the coaxial cable 4. Assume now that two packet signals $P_{21}$ and $P_{22}$ are inserted in a frame which begins at a time $t_0$ a little earlier than time $t_1$, and that there are two empty blocks in the rear portion of the frame. In this case, the transmission controlling circuit 990 controls the transmitting logic circuit 941 to insert a new packet signal $P_{23}$ shown as a hatched portion in FIG. 4(c) into the appropriate block in the next frame which is initiated from time $t_2$. That is, the data of the packet signal $P_{12}$ written in the transferring buffer memory 931 is caused to be successively read out after a lapse of the waiting time shown in FIG. 4(b) and is converted into a packet signal $P_{23}$, in the code format for cable transmission. In the packet signal $P_{23}$, the destination code of the called station, which was written in the transfer data DATA in the previous packet signal $P_{12}$, is posted as the destination address DA.

The thus formed packet signal $P_{23}$ is sent out onto the coaxial cable 4 through the transmitting buffer amplifier 951. In this case, the transmission of the packet signal $P_{23}$ will be successful unless a station of system #2 by chance sends out its packet in the block in which the packet signal $P_{23}$ is sent. That is, the packet signal $P_{12}$ transmitted on the coaxial cable 2 is converted into the packet signal $P_{23}$ in the repeating installation 9 and transmitted on the coaxial cable 4. In case of packet signal collision, the collision detecting circuit 982 detects this fact and causes the transmission of packet signal $P_{12}$ to be stopped. The transmission controlling circuit 990 is also informed of the packet signal collision and this fact is reported to the calling station of system #1 by the transmitting logic circuit 942. In this case, the transmission controlling circuit 990 generates a random number using an intra-office random number generator (not shown) and again tries to transmit a packet signal of the same contents after a lapse of a random waiting time based on the generated random number.

Assume next that there are not two empty blocks in the frame which begins at time $t_0$. In the case, the transmission controlling circuit 990 causes the two blocks of data written in the transferring buffer memory 931 to be discarded. The transmission controlling circuit 990 watches the "emptiness" of the frame initiated from time $t_2$ in system #2, and if necessary empty blocks cannot be found within a predetermined period of time, gives up on sending the packet signal onto the coaxial cable 4. That is, in this case, the transmission controlling circuit 990 causes the transmitting logic circuit 942 to send out an answer packet representing a busy indication to the calling station. When the situation requires, the calling station again tries to send a packet signal of the same contents after the lapse of a predetermined time.

When a packet has been sent out from a station in system #1 to a station in system #2 and an answering packet for communication or the like has been sent back in the reverse direction thereto, two intercommunication channels are established between these two stations and digital data transmission is initiated. In this case, the destination code of the repeating installation 9 is written in the destination address DA of the packet signal sent out from each station but the destination code of the sender station per se is not described even in the transfer data DATA. However, the repeating installation stores the destination code of each calling station when calling is set, and the transmitting logic circuits write this code as the destination address DA in the packet signal, so no problems are therefore caused.

Thus, when the sending of a packet signal is initiated through the repeating installation, data to be transferred can be successively transmitted with a delay time (waiting time) shorter than one frame at longest, as will be apparent from FIG. 4. Accordingly, it is sufficient for each of the transmitting buffer memories 931 and 932 to have a memory capacity equal to the total bit number of one frame, even though a situation such that all the packet signals in one frame are repeated is considered. In a practical case, it is usually possible to set the memory capacity to be smaller than the number of bits of a half of the length of one frame, on the basis of a statistical estimate of the traffic amount in one frame. In this case, although there sometimes occurs a shortage of memory capacity, it is possible to avoid problems in practical use by sending out answering busy indication packets.

In the above embodiment, two systems #1 and #2 are operated quite independently of one another, and frame timing is therefore established independently. In the earlier described digital signal transmission system, when none of the stations connected to a communication cable is effecting signal transmitting/receiving operations, no signal which provides reference to each frame or a signal which indicates subdivision positions of each block is transmitted. Thus, in this system, the station which has effected the earliest transmission of all is caused to take the initiative in establishing system timing such as frame synchronization. When the station which has taken the initiative (hereinafter referred to as a master station) effects signal transmission with a block length and a frame period which are predetermined by inter-station agreement, each of the other stations in the same system establish the block and frame timings on the basis of the packet signal sent out from the master station (hereinafter referred to as a master packet), and independently search empty blocks so as to occupy them for a necessary period of time to perform signal transmission. When the master station has completed the necessary communication, any other station which is effecting communication at this time becomes the master station and takes the initiative in frame synchronization, etc.

Thus, the digital signal transmission rate on the communication cable is determined by a transmission clock signal generator (corresponding to the transmission clock signal generator 961 in the repeating installation 9) in the master station, and frame timing is determined by a frame counter (corresponding to frame counters 971 and 972 in the repeating installation 9) in which the output of the transmission clock signal generator of the master station is frequency-divided. Accordingly, if systems #1 and #2 are quite independent of each other, it is naturally considered that there will arise a difference in frequency of the transmission clocks used in these systems.

If there is a difference in frequency of the transmission clocks, the relative time relation between the respective frame timings of systems #1 and #2 may change as time elapses. For example, when the transmission clock frequency used in system #1 is lower than that used in system #2, the frame timing of system #2 shown in FIG. 4(c) moves leftward in the drawing as time elapses, with respect to that of system #1 shown in FIG. 4(a). Thus, at a certain point in time, the waiting time shown in FIG. 4(b) becomes zero. At this instance, there arises a phenomenon such that the same packet $P_{12}$ is read out twice and the converted packet $P_{23}$ is produced in two successive frames. In the opposite case, the frame timing of system #2 shown in FIG. 4(c) moves rightward in the drawing relative to that of system #1. In this case, the waiting time may increase to exceed the length of one frame, so that the contents of the packet $P_{12}$ to be converted into a packet $P_{23}$ fails once to be read out, namely one frame thereof, resulting in an omission in the transferred data.

It is possible according to the invention to suppress the phenomena of the overlapping or omission of transfer data, when the signal has higher redundancy, for example in case of audio information. For example, assume now that digital signal transmission is effected under the following conditions:

(i) Digital signal transmission rate: 10 Mbps;
(ii) Length of one frame: 10 ms=100 Kbits; and
(iii) Transmission clock frequency stability: $1 \times 10^{-5}$, namely, 10 MHz±100 Hz.

In this case, since a deviation of 200 bits/sec may occur in the worst situation, the frequency of occurrence of overlapping of omission in the transfer data is once per 500 seconds (=100 K/200). Since the period of time of overlapping or omission is 10 ms, overlapping or omission may be neglected in general. With respect to the transmission of low redundancy data, the phenomena of overlapping or omission in the transfer data may be neglected, for example, by producing a sending-repeat request at the receiving side.

However, there is no such detect in each communication system per se. Namely, the transmission mode in the complex communication system is a synchronized transmission system for the whole system when a plurality of systems are interconnected in putting the present invention into practice. This is attained by providing transmission clock signal generators synchronized with one another in master stations of the respective systems. However, since it is difficult to prepare oscillators having no frequency difference for the respective transmission clock signal generators, the following means may be considered in a practical case:

(1) When two existing systems are connected, the repeater station connecting the two systems is caused to permanently be the master station and to continuously send a dummy packet to both of the two stations regardless of whether there is any signal to be transferred. In this case, it is not desirable that two transmission clock signal generators exist in the repeater station (or repeating installation) as shown in FIG. 3. In the FIG. 3 embodiment, however, for the sake of facilitating the explanation of the function of the repeating installation for connecting two systems, two transmission clock signal generators have been illustrated corresponding to the respective systems. It is a matter of course that only one transmission clock signal generator may be commonly used. This is because there is no requirement that the two clock signal generators be independent of each other. Since it is necessary to commonly use one transmission clock signal generator in a repeater station when two systems are connected, it becomes possible to commonly use one frame counter, while two frame counters have been provided in FIG. 3.

(2) When three or more existing stations are connected, two or more repeater stations are provided. Accordingly, it is necessary in this case to rank the repeater stations in the system timing.

FIG. 6 shows a communication system in which four systems are syncrhonized. Four existing systems #1 to #4 are connected through three repeater stations 9A to 9C. Assume now that with respect to the system timing, the repeater station 9A which connects systems #1 and #2 is ordered in a higher rank, the repeater station 9B which connects systems #2 and #3 is in a middle rank, and the repeater station 9C which connects systems #3 and #4 is in a lower rank.

In this communication system, when no packet is sent from the respective systems #1 to #4, a dummy packet is continually sent from the high ranked repeater station 9A to the two systems #1 and #2. Each of the stations in each of systems #1 and #2 receives this dummy packet and resets an intra-office frame counter every time a frame is initiated, so that synchronization is made with the frame timing of the repeater station 9A among the stations in each of the systems #1 and #2. The middle rank repeater station 9B also receives the dummy packet to establish frame timing.

In the dummy packet sent from the high rank repeater station 9A, the destination code of the middle rank repeater station is described in the destination address DA, and the respective destination codes of the low rank repeater station 9C and an imaginary station of system #4 are described in this order in the transfer data DATA. The middle rank repeater station 9B forms, on the basis of the received dummy packet, a conversion dummy packet in which the destination code of the low rank repeater station 9C is described in the destination address DA and the destination code of the above-mentioned imaginary station of system #4 is described in the transfer data DATA. The conversion dummy packet is sent to system #3 with system timing synchronized by the reception of the dummy packet.

In system #3, in which a number of stations are connected to the coaxial cable which is in turn connected at its ends to terminators $11_1$ and $11_2$, all stations receive the conversion dummy packet and are synchronized with the frame timing of the high rank repeater station 9A. The low rank repeater station 9C receives the conversion dummy packet as a packet destined thereto to establish frame timing and forms, on the basis of the received conversion dummy packet, a reconversion packet in which the destination code of the above-mentioned imaginary station of system #4 is described in the destination address DA. The reconversion dummy packet is sent to system #4 with the system timing synchronized in response to the reception of the conversion dummy packet.

In system #4, in which a number of stations are connected to the coaxial cable thereof connected at its ends to terminators $12_1$ and $12_2$, each of the stations receives the conversion dummy packet and is synchronized with the frame timing of the high rank repeater station 9A. Thus, in the whole system, system timing is established with the frame timing of the high rank repeater station 9A.

In case the higher ranked repeater station 9A cannot transmit the dummy packet for some reason or other, the middle ranked repeater station 9B sends the dummy packet in place of the high rank repeater station. By this, system timing is established, among systems #2 and #3 and #4 synchronized with the frame timing of the middle rank repeater station 9B, with the remaining system #1 being left to function as a conventional system. Namely, in the situation where any station other than the repeater station 9A of the system #1 first sends a packet signal, system timing is established in synchronism with the sending of the packet signal. In this case, general system timing cannot be established unless there exists a status such that no packet signal is transmitted/received for at least one frame in system #1, even if the failure of repeater station 9A is recovered. Accordingly, it is necessary to take action to improve reliability by providing a back-up with respect to the power supply of the repeater station and/or by doubling the stations 9A to 9C, where there is a large quantity of transferred information between systems or when the transferred information is very important.

When a transfer packet is sent from station X of system #1, for example, to station Y of system #3 after timing synchronization has been established in all the systems, data is transferred between frames relatively fixed in all the systems. Thus, completely synchronized transmission is enabled.

As described above in detail, according to the present invention, a repeating installation or station connecting plural inter-multistation communication systems effecting digital signal transmitting/receiving operations in a packet form in a time division multiplex mode using a communication cable, includes two input means to be respectively connected to two systems, a buffer memory for temporarily storing the contents of a packet sent from one of the two systems to the other system, and means for sending the contents read out of said buffer memory after a lapse of a predetermined time as a packet to the next system, and has the following features:

(1) In each system, information can be transferred in accordance with its system timing. Accordingly, when the whole communication system is to be expanded, there is no limit in the number of systems constituting the whole communication system and sufficient expansion can be made.

(2) One frame of bits or less suffices for the memory capacity of the transfer buffer memory provided in each repeating installation or repeater station, even if the amount of transfer information is huge. Thus, an economical repeating connection having a shorter transfer delay time may be attained.

(3) The frame timing synchronization among all the stations may be attained by causing a dummy packet to continuously flow on the whole communication system. Namely, it is possible to provide a completely synchronized transmission system.

What is claimed is:

1. A digital signal repeating system, comprising: a plurality of digital signal transmission systems interconnected by repeating installations, each such system being a time division multiple access system of the type in which multiple stations access a communication cable by transmitting packets of information during available time slots of successive periodically repeated frames, each one of said stations selecting a time slot for transmission of its packets on a time slot available basis, wherein each of said repeating installations comprises: input/output means for effecting digital signal input or output operations between two signal transmission systems interconnected by said repeating installation, packet selecting means for selecting only packets to be sent from one of said two signal transmission systems to the other signal transmission system, buffer memory means for writing thereinto transfer information of a packet which is to be sent to said other signal transmission system and which is selected by said packet selecting means, and transmission control means for reading out the transfer information so as to transmit it as a packet to said other signal transmission system, thereby enabling digital signal transmission in packet form between different signal transmission systems in one and the same communication system; said transmission control means comprising frame detection means responsive to the digital signal transmissions on said other signal transmission system for controlling the time of transmission of said packet to place said packet within said frame in a time slot not otherwise occupied by digital signal transmissions.

2. A digital signal repeating system according to claim 1, wherein each of said repeating installations further comprises a single transmitting clock signal generator used commonly by the two signal transmission systems interconnected by said repeating installation.

3. A digital signal repeating system according to claim 2, wherein each of said repeating installations further comprises a frame counter used commonly by the two signal transmission systems interconnected by said repeating installation, whereby respective frames on the time axis are generated in said two signal transmission systems with the same timing.

4. A digital signal repeating system according to claim 3, wherein one of said repeating installations continually transmits a dummy packet to the signal transmission system connected to the respective repeating installation from a time prior to the establishment of timing in the signal transmission systems, thereby establishing synchronization between said the signal transmission systems.

5. A digital signal repeating system according to claim 2, wherein said signal transmission systems are ranked in order to their chain connection by said repeaters so that a dummy packet is sent from a repeating installation connected to a higher ranked signal transmission system to another repeater connected to a lower rank signal transmission system, the transmission timing of said dummy packet being effected in each of said repeating installations except for the highest rank repeating installation on the basis of a frame on the time axis synchronized by said dummy packet as received in the respective repeater.

6. A digital signal repeating system according to claim 5, wherein when one of said repeating installations connected to a higher ranked signal transmission system from which a dummy packet is to be transmitted fails to transmit said dummy packet, a lower ranked repeating installation sends out a dummy packet to signal transmission systems which are interconnected by this repeating installation.

7. A digital signal repeating system according to claim 1, each said repeating installation including receiving buffer amplifiers for receiving all those signals transmitted on a respective cable to which the respective repeating installation is connected, said packet selecting means determining whether a given signal is to be transmitted to the respective other cable connected to the repeater installation on the basis of a destination code of a given packet.

8. A digital signal repeating system according to claim 7, each said repeating installation including first and second collision detecting circuits, said transmission control means being responsive to a collision detection to transmit a predetermined signal to the originating station.

9. A digital signal repeating system according to claim 9, said packet selecting means controlling buffer memory means for the storage of a signal to be transferred, and generating a transfer request signal inputted to said transmission control means.

10. A digital signal repeating system according to claim 1, said transmission control means causing transmission of said transfer information after a waiting time dependent upon the availability of a free block within a frame of said other signal transmission system.

* * * * *